(12) United States Patent
Jeong et al.

(10) Patent No.: US 11,249,214 B2
(45) Date of Patent: Feb. 15, 2022

(54) NOISE SUPPRESSION OF SEAFLOOR GEOPHONE SEISMIC DATA

(71) Applicant: Saudi Arabian Oil Company, Dhahran (SA)

(72) Inventors: Woodon Jeong, Dhahran (SA); Constantinos Tsingas, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 876 days.

(21) Appl. No.: 15/992,443

(22) Filed: May 30, 2018

(65) Prior Publication Data
US 2019/0369280 A1   Dec. 5, 2019

(51) Int. Cl.
*G01V 1/36* (2006.01)
*G01V 1/18* (2006.01)

(52) U.S. Cl.
CPC .............. *G01V 1/364* (2013.01); *G01V 1/181* (2013.01); *G01V 1/186* (2013.01); *G01V 2210/324* (2013.01)

(58) Field of Classification Search
CPC ..................................................... G01V 1/364
See application file for complete search history.

(56) References Cited

U.S. PATENT DOCUMENTS

| | | | | |
|---|---|---|---|---|
| 5,757,720 A * | 5/1998 | Soubaras | ............... | G01V 13/00 367/13 |
| 6,021,090 A * | 2/2000 | Gaiser | .................. | G01V 1/3808 367/15 |
| 6,651,007 B2 | 11/2003 | Ozbek | | |
| 2008/0221801 A1 | 9/2008 | Craft et al. | | |
| 2012/0250460 A1 | 10/2012 | Edme et al. | | |
| 2013/0021873 A1 * | 1/2013 | Mattocks | ................. | G01V 1/36 367/24 |

OTHER PUBLICATIONS

Barr and Sanders, "Attenuation of Water-Column Reverberations Using Pressure and Velocity Detectors in Water-Bottom Cable," SEG Expanded Abstracts from the 59th Annual International Meeting, Nov. 2, 1989, 4 pages.

Soubaras, "Ocean bottom hydrophone and geophone processing," SEG Expanded Abstracts from the 66th Annual International Meeting, Nov. 10-15, 1996, 4 pages.

Shatilo et al., "Effect of Noise Suppression on Quality of 2C OBC Image," SEG Expanded Abstracts from the 74th Annual International Meeting, Oct. 10, 2004, 4 pages.

Gaiser, "Detector coupling corrections for vector infidelity of multicomponent OBC data," Geophysics vol. 72, No. 3, May-Jun. 2007, 11 pages.

(Continued)

*Primary Examiner* — Hyun D Park
(74) *Attorney, Agent, or Firm* — Fish & Richardson P.C.

(57) ABSTRACT

Methods, systems, and computer-readable medium to perform operations for suppressing seafloor geophone seismic data noise. A computing system applies a vertical geophone de-noise process to enhance a compressional wave signal that is free from (independent of) shear energy leakage. This enhances the signal to noise (S/N) ratio of the vertical geophone component and concurrently make the vertical geophone component consistent with a hydrophone component.

20 Claims, 8 Drawing Sheets
(4 of 8 Drawing Sheet(s) Filed in Color)

(56) References Cited

OTHER PUBLICATIONS

Craft and Paffenholz, "Geophone noise attenuation and wave-field separation using a multi-dimensional decomposition technique," 70th EAGE Conference and Exhibition, Extended Abstracts, Jun. 9, 2008, 5 pages.

GCC Examination Report in GCC Appln. No. GC2019-37657, dated Jul. 8, 2020, 5 pages.

PCT International Search Report and Written Opinion in International Appln. No. pct/us2019/032101, dated Aug. 19, 2019, 16 pages.

Yuan: "Analysis of four-component seafloor seismic data for seismic anisotropy", Abstract Only, Thesis for degree of Doctor of Philosophy, University of Edinburgh, Department of Geology and Geophysics, Jan. 2001, 5 pages.

GCC Examination Report in GCC Appln. No. GC2019-37657, dated Dec. 15, 2020, 5 pages.

GCC Examination Report in GCC Appln. No. GC 2019-37657, dated Jun. 6, 2021, 4 pages.

* cited by examiner

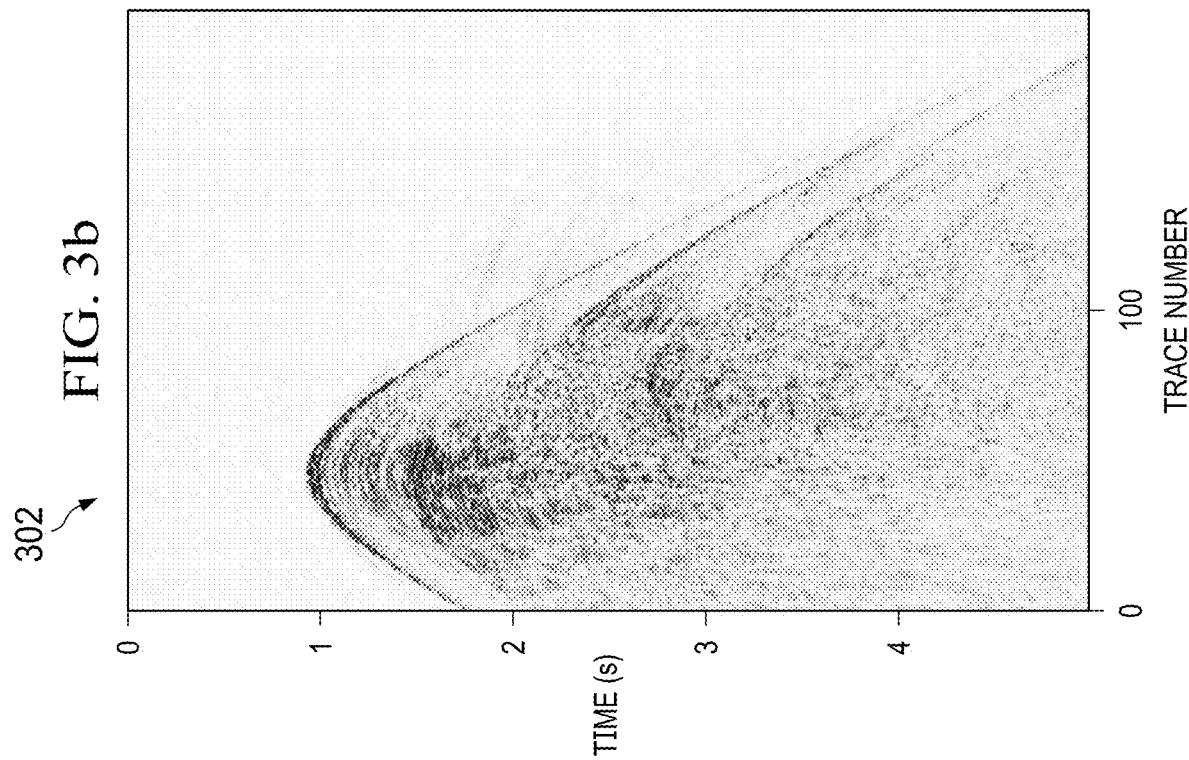
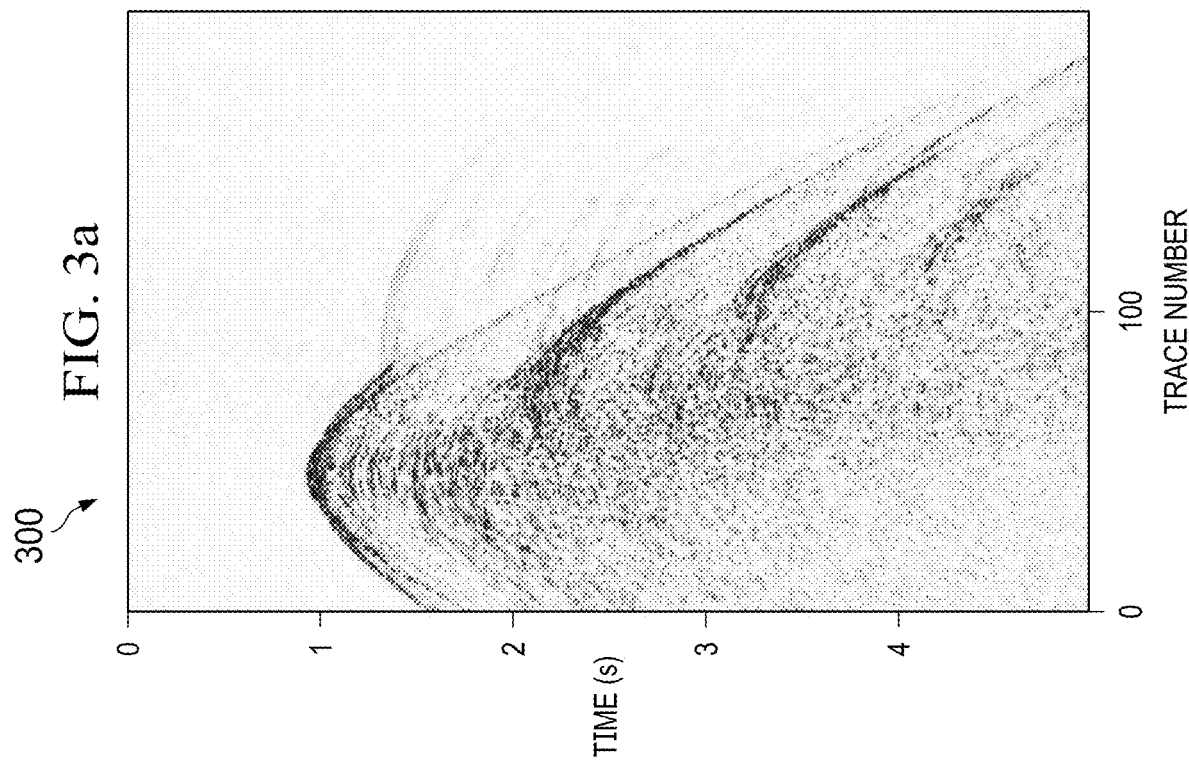

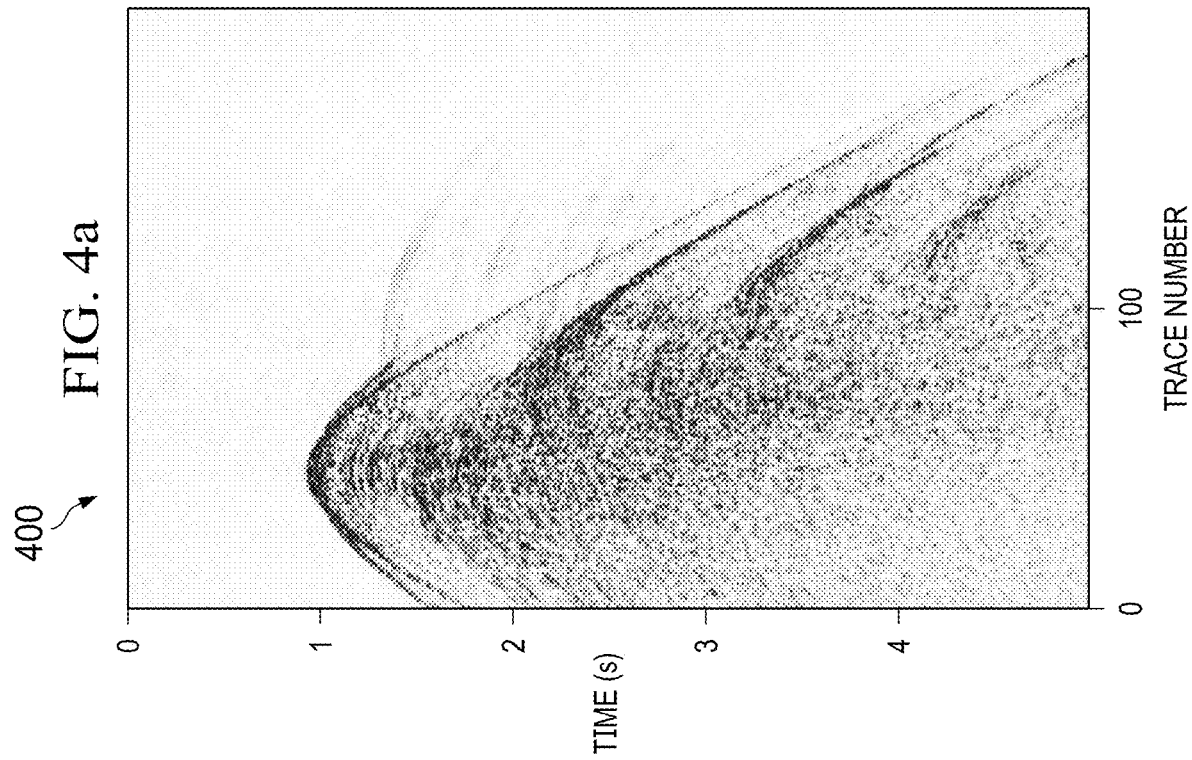

NOISE SUPPRESSION OF SEAFLOOR GEOPHONE SEISMIC DATA

TECHNICAL FIELD

This disclosure relates to noise suppression of seafloor geophone seismic data, and in particular, applying a vertical geophone de-noise process to enhance a compressional wave signal free from (independent of) shear energy leakage.

BACKGROUND

During seafloor seismic acquisition using either nodes or cables, pressure and particle velocities/accelerations are recorded using hydrophone (for example, one hydrophone) and geophone/accelerometers (for example, three geophones) as sensors, respectively. Data bandwidth recorded with sensors located at the seafloor exhibit a broader signal bandwidth as compared to steamer data—the data quality recorded in a significantly quieter environment (for example, closer to the seabed) is superior than data recorded using a streamer cable (for example, closer to the water surface). However, seafloor acquisition of data suffers from various types of noise generated by suboptimal sensor coupling with the seafloor such as Scholte waves, backscattering noise, and converted shear waves. Multicomponent seafloor recordings minimize, if not eliminate, receiver side ghost and water-layer multiples by combining the hydrophone (P) and the vertical geophone (Z) components, that is, PZ summation. PZ summation depends on the de-noising process on the vertical geophone component. Suppression of this noise includes velocity filtering, and dip and frequency filtering. A multichannel (for example, multi-dimensional) filtering applied in various data transform domains such as frequency-wavenumber and radon. In addition, a decoupling correction for vector infidelity can be used by using adaptive subtraction of the shear wave from the vertical geophone component.

SUMMARY

The present disclosure discusses noise suppression of seafloor geophone seismic data. Specifically, multi-component data that is obtained using ocean bottom sensors (either nodes or cables) can be separated (the full wavefield) into up-going and down-going wavepaths. To clean up/down separation, the noise recorded at various components of the sensors can be minimized or eliminated. To that end, during seafloor seismic acquisition, four components are recorded—one hydrophone and three geophone (one vertical and two horizontals). However, unlike the hydrophone component, the vertical geophone component recorded at the ocean floor can be contaminated by a number of noise features such as Scholte waves, backscattering noise, and shear converted waves. These types of noise cause a number of issues during data processing and degrade the effectiveness of up/down separation.

Thus, the present disclosure discusses obtaining cleaner vertical geophone components by i) applying a masking filter to decompose the vertical geophone traces into less sensitive and mutually dependent parts with the horizontal geophone traces, ii) adaptive subtraction of the horizontal geophone traces from the vertical geophone traces, and iii) matching the signal envelope between the hydrophone and vertical geophone traces.

Innovative aspects of the subject matter described in this specification may be embodied in methods that include the actions of receiving data identifying i) a hydrophone seismic data component, ii) a vertical geophone seismic data component, and iii) a first and a second horizontal geophone seismic data component. The vertical geophone seismic data component is partitioned into a first and a second vertical geophone seismic data component using a masking filter based on the first horizontal geophone seismic data component and the vertical geophone seismic data component. The first horizontal geophone seismic data component is adaptively subtracted from the second vertical geophone seismic data component to obtain a first new vertical geophone seismic data component. The first vertical geophone seismic data component and the first new vertical geophone seismic data component are summed to obtain a de-noised vertical geophone seismic data component. The de-noised vertical geophone seismic data component is partitioned into a first and a second de-noised vertical geophone seismic data component using the masking filter based on the second horizontal geophone seismic data component and the de-noised vertical geophone seismic data component. The second horizontal geophone seismic data component is adaptively subtracted from the second de-noised vertical geophone seismic data component to obtain a second new vertical geophone seismic data component. The first de-noised vertical geophone seismic data component and the second new vertical geophone seismic data component are summed to obtain a further de-noised vertical geophone seismic data component A signal envelope between the hydrophone seismic data component and the vertical geophone seismic data component is matched based on the hydrophone seismic data component and the further de-noised vertical geophone seismic data component to identify a scaling coefficient A final vertical geophone seismic data component is obtained based on i) the second de-noised vertical geophone seismic data component and ii) the scaling coefficient.

Other embodiments of these aspects include corresponding systems, apparatus, and computer programs that are configured to perform the actions of the methods encoded on computer storage devices.

These and other embodiments may each optionally include one or more of the following features. For instance, a sensitivity of the first vertical geophone seismic data component to the first horizontal geophone seismic data component is less than a sensitivity of the second vertical geophone seismic data component to the first horizontal geophone seismic data component. The second vertical geophone seismic data component complements the first vertical geophone seismic data component. The masking filter is a Butterworth filter. The first and the second horizontal geophone seismic data components include shear wave energy. Matching the signal envelope is based on a Hilbert transform. An amplitude of the final vertical geophone seismic data component is similar to an amplitude of the hydrophone seismic data component. The de-noised vertical geophone seismic data component is independent of the first horizontal geophone seismic data. The further de-noised vertical geophone seismic data component is independent of the second horizontal geophone seismic data.

Particular implementations of the subject matter described in this specification can be implemented so as to realize one or more of the following advantages. For example, implementation of the subject matter provides elimination of undesirable noise form the vertical geophone data recorded on the seafloor during ocean bottom seismic acquisition to produce a cleaner vertical geophone component. By doing so, implementations of the subject matter provide for the efficient usage of computer resources by minimizing subsequent processing of the seafloor data (for example, PZ summation, up/down deconvolution, de-multiple applications) as the data is "cleaned" prior to such processing.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 3a and 3b illustrate the decomposed portion of the vertical geophone seismic data component.

FIG. 4a illustrates the filtered vertical geophone seismic data component (traces).

FIG. 4b illustrates the filtered vertical geophonic seismic data component after applying a second filtering step.

DETAILED DESCRIPTION

Figure 1:
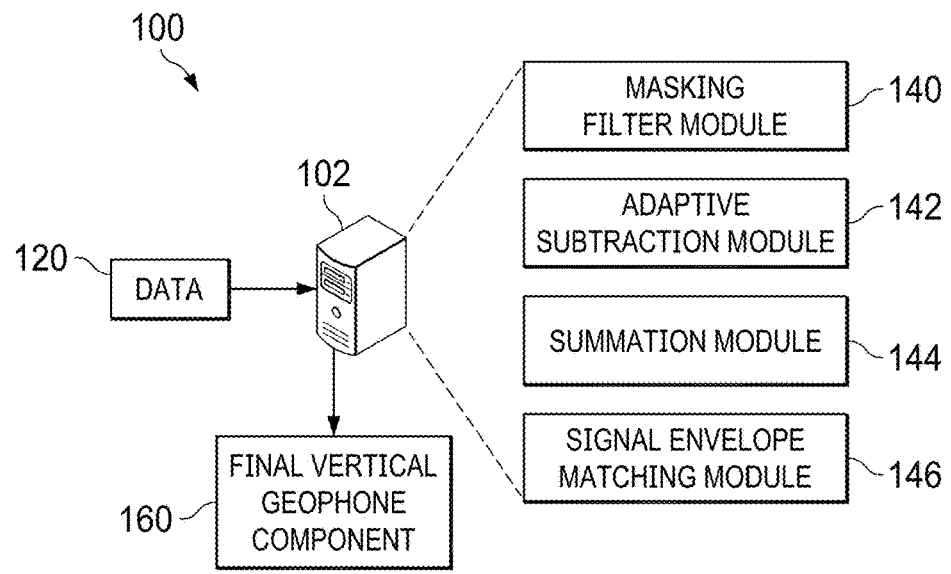
FIG. 1 is a schematic illustration of a system for suppressing seafloor geophone seismic data noise.

The present disclosure describes a computing system 100 for suppressing seafloor geophone seismic data noise, shown in FIG. 1. Specifically, the computing system 100 applies a vertical geophone de-noise process to enhance a compressional wave signal that is free from (independent of) shear energy leakage. This enhances the signal to noise (S/N) ratio of the vertical geophone component and concurrently make the vertical geophone component consistent with a hydrophone component.

The computing system 100 includes a computing device 102 that can be in communication with one or more other computing systems (not shown) and data stores (not shown) over one or more networks (not shown). The system 100 includes a masking filter module 140, an adaptive subtraction module 142, a summation module 144, and a signal envelope matching module 146. Each of the masking filter module 140, the adaptive subtraction module 142, the summation module 144, and the signal envelope matching module 146 can be a separate server computing system. Each of the masking filter module 140, the adaptive subtraction module 142, the summation module 144, and the signal envelope matching module 146 can be a combination of server computing systems. In some implementations, each of the masking filter module 140, the adaptive subtraction module 142, the summation module 144, and the signal envelope matching module 146 can be implemented in a same set of physical hardware.

The computing device 102 receives data 120. The data 120 identifies i) a hydrophone seismic data component, ii) a vertical geophone seismic data component, and iii) a first and a second horizontal geophone seismic data component. In some examples, the first and the second horizontal geophone seismic data components include shear wave energy.

The computing device 102, and in particular, the masking filter module 140, applies a masking filter based on the first horizontal geophone seismic data component and the vertical geophone seismic data component to partition the vertical geophone seismic data component into a first and a second vertical geophone seismic data component. Specifically, the masking filter module 140 applies the masking filter for rejecting undesirable noise (for example, shear wave leakage) while preserving the compressional wave signal. In some examples, the masking filter includes a Butterworth type filter. In some examples, the masking filter (Ø(t), as a function of time t) is expressed as in Equation [1]:

$$\emptyset(t) = \frac{1}{\sqrt{1 + \left(\frac{A(t)}{\varepsilon Z(t)}\right)^{2n}}} \quad [1]$$

where A (t) includes the auxiliary components (horizontal geophone seismic data components, X or Y or radial components R or T), and Z(t) indicates the vertical geophone seismic data component. The variables c and n are weighting and smoothing coefficients (for example, 1), respectively.

Figure 2B:
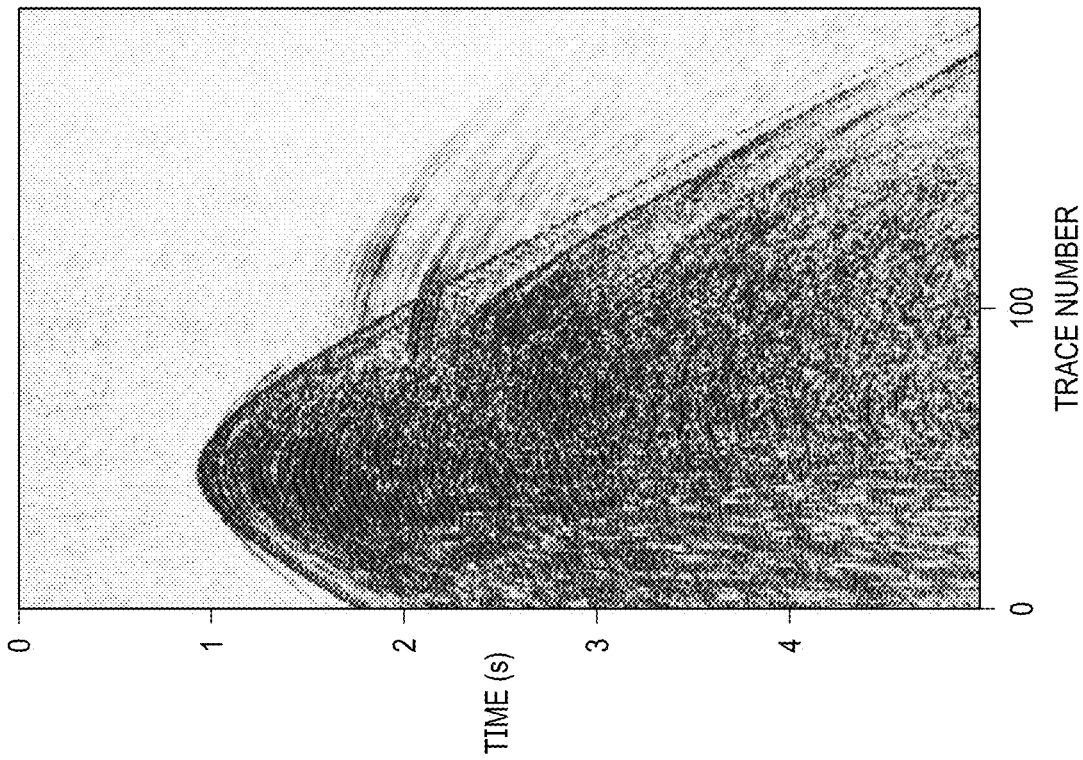
FIGS. 2a and 2b illustrate an example of the vertical geophone seismic data component and the horizontal geophone seismic data components.
Figure 2A:
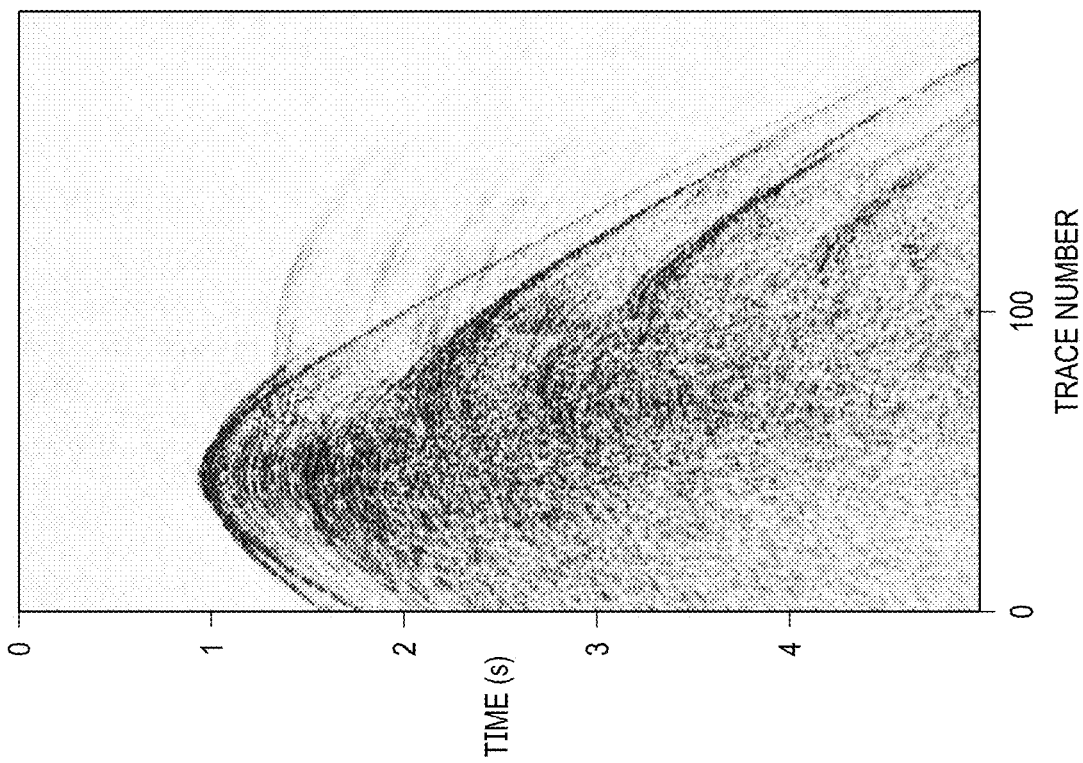

In some examples, the first and the second horizontal geophone seismic data components (X and Y or radial and transverse components) are comprised at least from shear wave energy. In some cases, part of this shear wave energy leaks into the vertical geophone seismic data component, and the vertical geophone seismic data component is partitioned into two parts as shown in Equations [2] and [3]:

$$I_1(t) = \emptyset(t)Z(T) \quad [2]$$

$$I_2(t) = (1-\emptyset(t))Z(t) \quad [3]$$

where $I_1$ corresponds to a part of the vertical geophone seismic data component which is less sensitive to the horizontal geophone seismic component; and where $I_2$ includes a part of the vertical geophone seismic data component which complements $I_1$ and corresponds to a part of the horizontal geophone seismic data components. In other words, i) a sensitivity of the first vertical geophone seismic data component to the first horizontal geophone seismic data component is less than a sensitivity of the second vertical geophone seismic data component to the first horizontal geophone seismic data component. Additionally, the second vertical geophone seismic data component complements the first vertical geophone seismic data component. FIGS. 2A and 2B illustrate examples 200, 202 of the data 120 including the vertical geophone seismic data component and the horizontal geophone seismic data components of the number of traces versus time. FIGS. 3A and 3B illustrate examples 300, 302 of the decomposed portion of the vertical geophone seismic data component ($I_1$ and $I_2$) using Equations [1], [2], [3].

The computing device 102, and in particular, the adaptive subtraction module 142, adaptively subtracts the first horizontal geophone seismic data component from the second vertical geophone seismic data component to obtain a first new vertical geophone seismic data component. Specifically, subsequent to obtaining the decomposition of the vertical geophone seismic data component into two parts (for example, $I_1$ and $I_2$) the first horizontal geophone seismic data component is adaptively subtracted from the second vertical geophone seismic data component (for example, $I_2$) according to a minimization of the following objective function (E(f)) as shown in Equation [4]:

$$E = \|I_2 - Af\|_2^2 \quad [4]$$

where A is a convolution matrix which includes elements A(t) (for example, horizontal geophone seismic data components). The adaptive subtraction module 142 performs the adaptive subtraction to facilitate estimating a shaping filter f that minimizes the objective function in Equation [4]. To solve this least squares problem, the adaptive subtraction module 142 utilizes a conjugate-gradient least-squares (CGLS) solver with an iteratively reweighted least-squares (IRLS) method.

The summation module 144 sums the first vertical geophone seismic data component and the first new vertical geophone seismic data component to obtain a de-noised vertical geophone seismic data component. Specifically, by minimizing the objective function according to Equation [4], the shear wave leakage found in $I_2$ is minimized, if not eliminated. Thus, the de-noised vertical $Z_1$ using the X (horizontal) or R (radial) components is represented by Equation [5]:

$$Z_1 = I_1 + (I_2 - Af) \quad [5]$$

In some examples, the de-noised vertical geophone seismic data component is independent of the first horizontal geophone seismic data.

FIG. 4a illustrates an example 400 of the filtered vertical geophone seismic data component (traces) after application of Equations [4] and [5] to the filter vertical geophone seismic data components. FIG. 4b illustrates an example 402 of the filtered vertical geophonic seismic data component after applying Equations [1]-[5] and the second horizontal geophone (the transverse component).

The computing device 102 repeats the partitioning, adaptive subtraction, and summation steps based on the de-noised vertical geophone seismic data component. Specifically, the masking filter module 140 applies the masking filter based on the second horizontal geophone seismic data component and the de-noised vertical geophone seismic data component. The masking filter module 140 can then partition the de-noised vertical geophone seismic data component into a first and a second de-noised vertical geophone seismic data component. That is, the masking filter module 140 applies Equations [1], [2], [3] based on the second horizontal geophone seismic data component and the de-noised vertical geophone seismic data component to partition the de-noised vertical geophone seismic data component into a first and a second de-noised vertical geophone seismic data component.

Further, the computing device 102, and specifically, the adaptive subtraction module 142, adaptively subtracts the second horizontal geophone seismic data component from the second de-noised vertical geophone seismic data component to obtain a second new vertical geophone seismic data component. That is, the adaptive subtraction module 142 applies Equation [4] to adaptively subtract the second horizontal geophone seismic data component from the second de-noised vertical geophone seismic data component to obtain a second new vertical geophone seismic data component. Moreover, the summation module 144 sums the first de-noised vertical geophone seismic data component and the second new vertical geophone seismic data component to obtain a further de-noised vertical geophone seismic data component. That is, summation module 144 applies Equation [5] to sum the first de-noised vertical geophone seismic data component and the second new vertical geophone seismic data component to obtain a further de-noised vertical geophone seismic data component. In some examples, the further de-noised vertical geophone seismic data component is independent of the second horizontal geophone seismic data.

The computing device 102, and in particular, the signal envelope matching module 146 matches a signal envelope between the hydrophone seismic data component and the vertical geophone seismic data component based on the hydrophone seismic data component and the further de-noised vertical geophone seismic data component to identify a scaling coefficient. In some examples, the signal envelope matching module 146 determines the signal envelop using a Hilbert transform as shown in Equations [6] and [7]:

$$Z_{analytic}(t) = Z_2(t) + \mathcal{H}[Z_2(t)], (i=\sqrt{-1}) \quad [6]$$

$$E(t) = \mathcal{H} \quad [7]$$

where H represents the Hilbert transform, E indicates the signal envelope and $Z_2$ is the further de-noised vertical geophone seismic data component. Based on determining the envelope response for the hydrophone seismic data component and the vertical geophone seismic data components, the signal envelope matching module 146 determines a scaling coefficient that scales the vertical geophone seismic data components (traces) with respect to the hydrophone seismic data component (traces) according to Equation 8:

$$\sigma(t) = E_H(t)/E_Z(t) = \begin{cases} 1 & \text{when } \sigma(t) \geq 1 \\ \sigma(t) & \text{else} \end{cases} \quad [8]$$

where the subscript H indicates the hydrophone seismic data component, subscript Z indicates the geophone seismic data component, and σ indicates the scaling coefficient.

As shown in FIG. 1, the computing device 102 obtains a final vertical geophone seismic data component 160 based on i) the second de-noised vertical geophone seismic data component and ii) the scaling coefficient. Thus, the final vertical geophone seismic data component 160 is expressed as:

$$Z_3(t) = \sigma(t)Z_2(t) \quad [9].$$

Figure 5C:
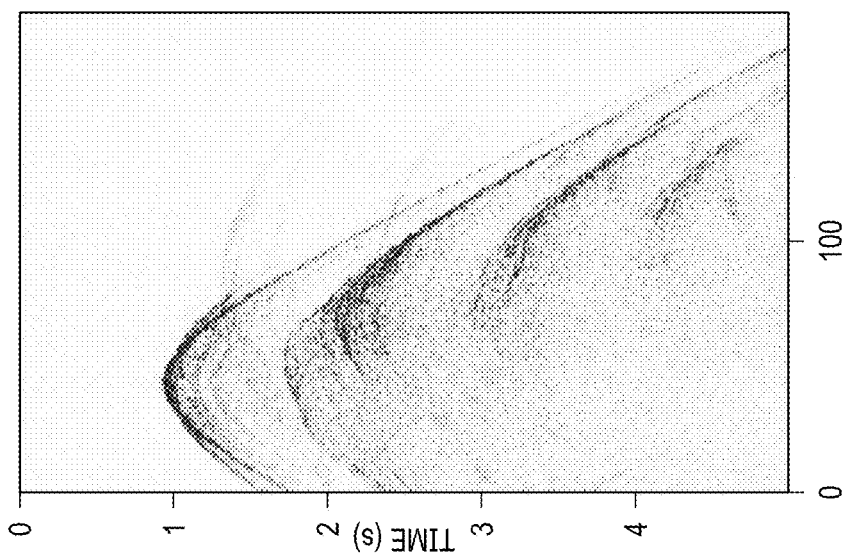
FIGS. 5a-5c illustrates the hydrophone seismic data component and the filter vertical geophone seismic data components.
Figure 5B:
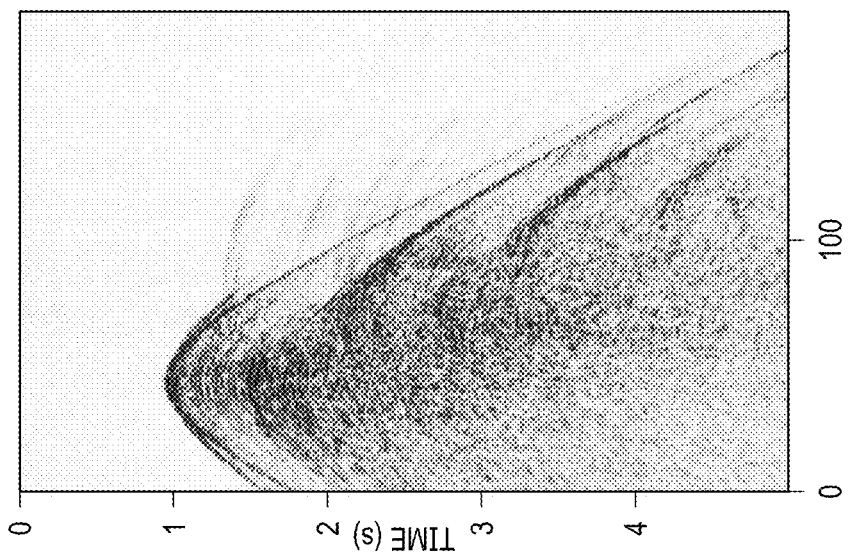
Figure 5A:
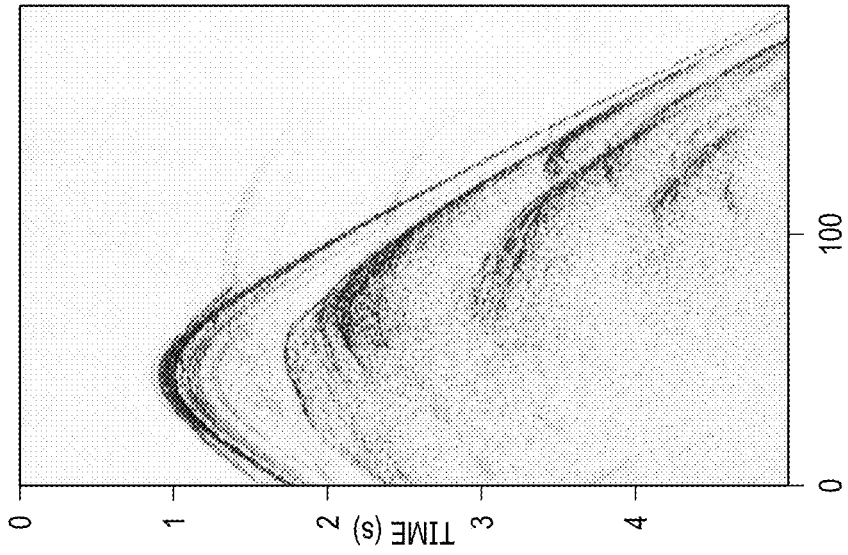

FIGS. 5a-5c illustrates the hydrophone seismic data component and the filter vertical geophone seismic data components (traces). Specifically, FIG. 5a illustrates an example 500 of the hydrophone seismic data component as a reference. FIG. 5b illustrates an example 502 of the initial geophone seismic data component that is contaminated by noise. FIG. 5c illustrates an example 504 of the final vertical geophone seismic data component 160.

Figure 6A:
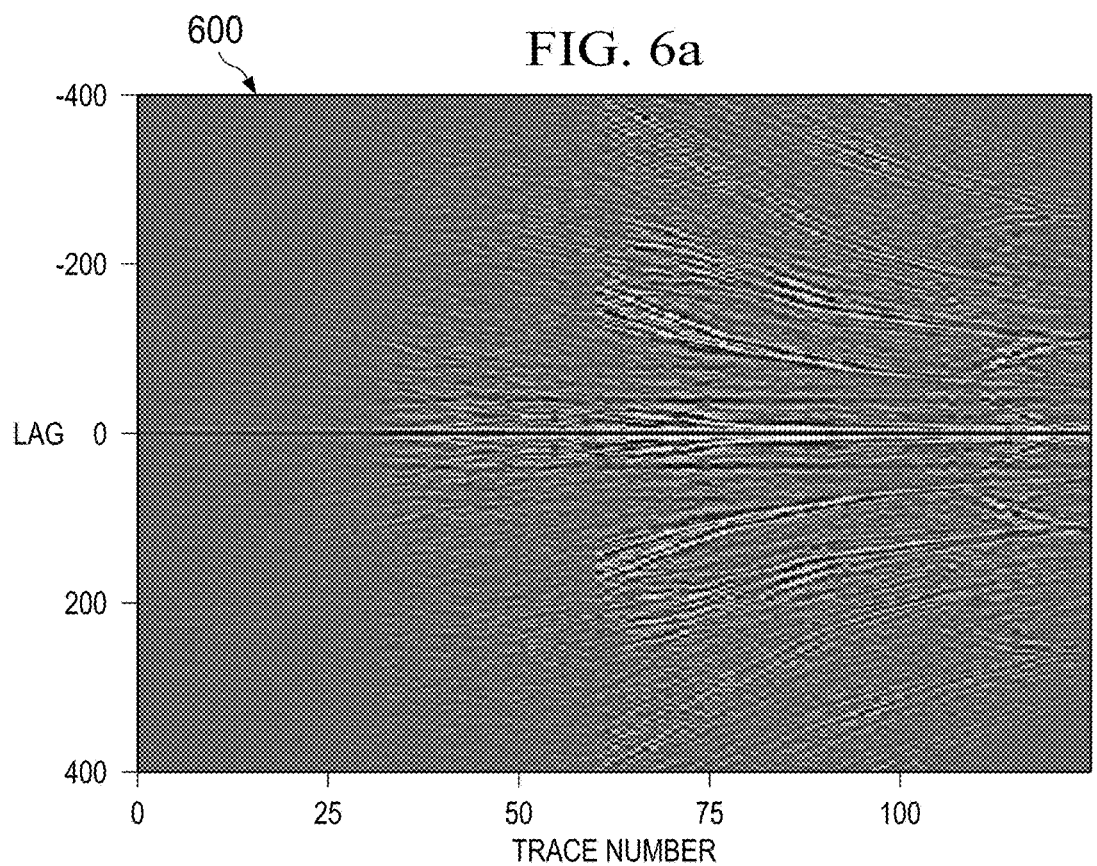
FIGS. 6a-6d illustrate correlation plots between the hydrophone seismic data component with the respective geophone seismic data components before and after the de-noising process.
Figure 6B:
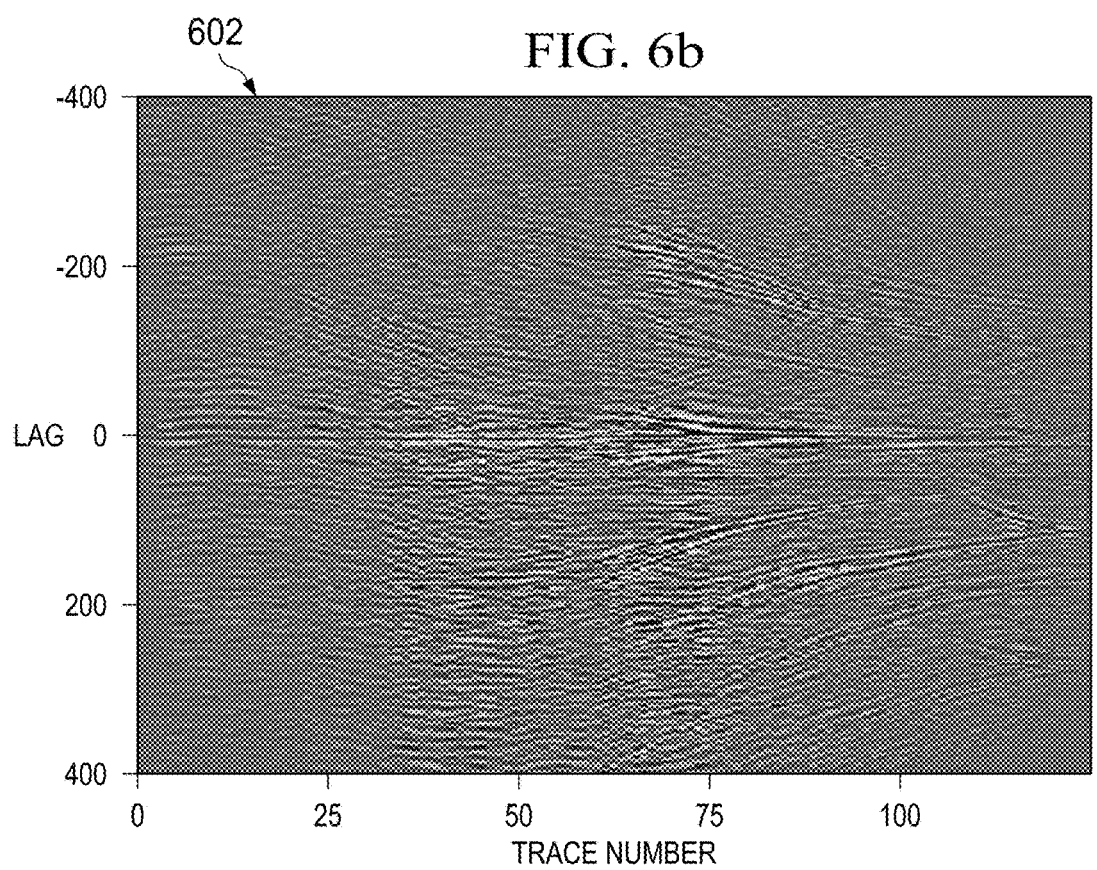
Figure 6C:
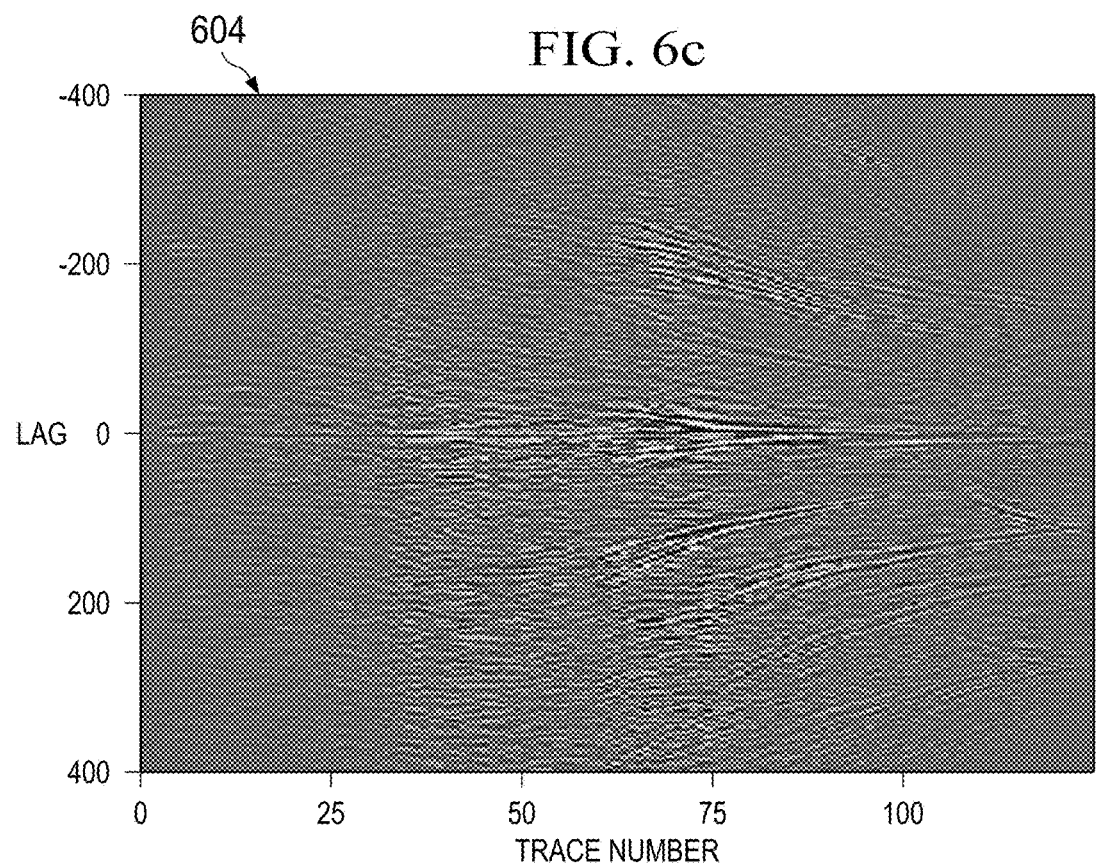
Figure 6D:
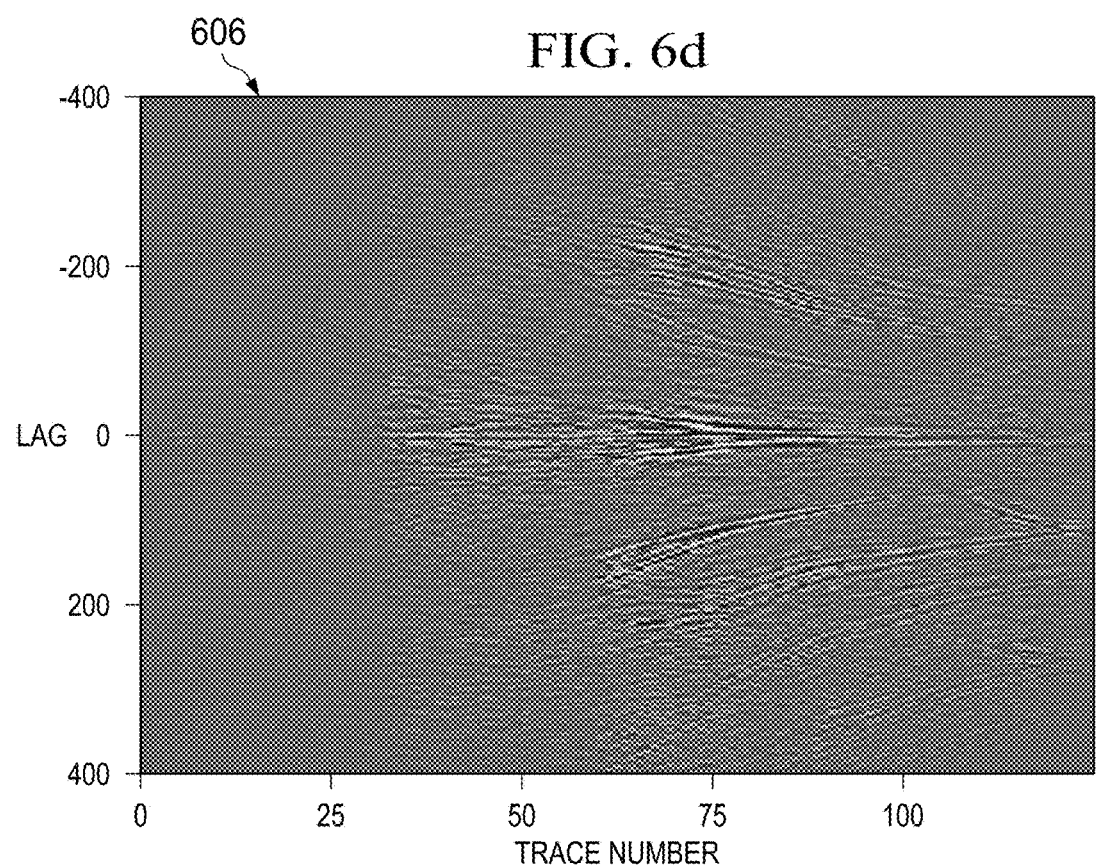

FIGS. 6a-6d illustrate correlation plots between the hydrophone seismic data component with the respective geophone seismic data components before and after the de-noising process. FIG. 6a illustrates an example 600 of a reference obtained by auto-correlation of the hydrophone seismic data component (traces). FIG. 6b illustrates an example 602 of the cross-correlation of the hydrophone seismic data component with the initial vertical geophone seismic data component. FIG. 6c illustrates an example 604 of the cross-correlation of the hydrophone seismic data component with the geophone seismic data components after applying the partitioning, adaptive subtraction, and summation steps further described. FIG. 6d illustrates an example 606 of the cross-correlation of the hydrophone seismic data component with the geophone seismic data component after obtaining the final vertical geophone seismic data component. The highest coherency between the reference hydrophone seismic data component with the vertical geophone seismic data component indicates that the effectiveness of the noise reduction that is applied to the vertical geophone seismic data component.

Figure 7:
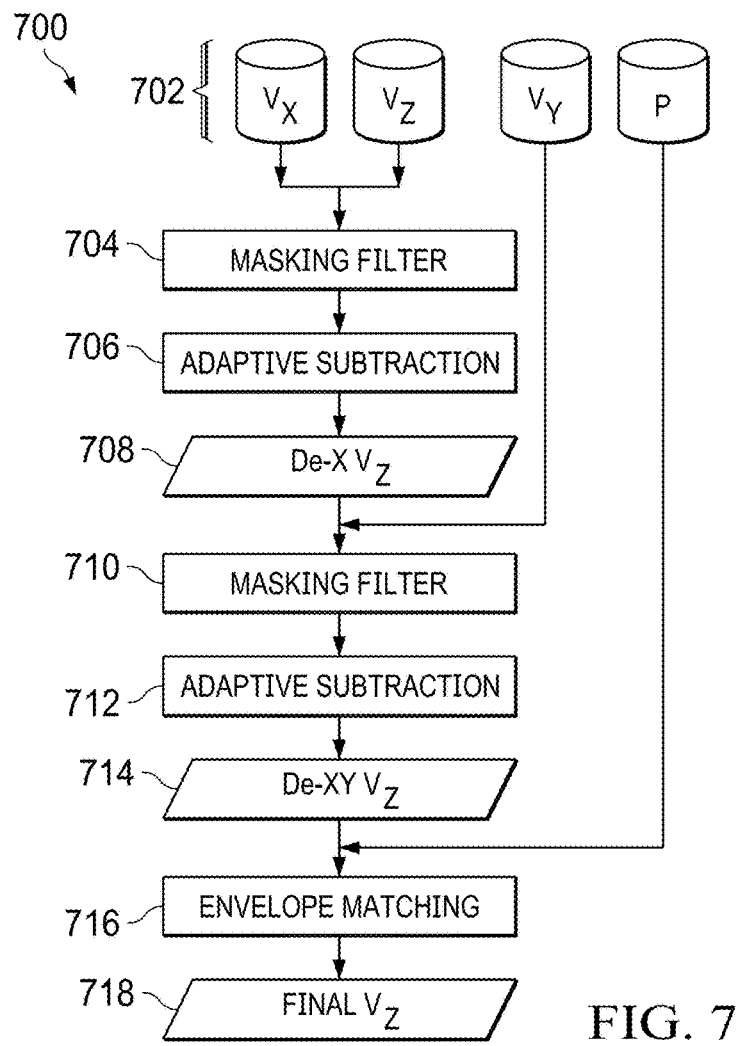
FIG. 7 illustrates a flowchart for suppressing seafloor geophone seismic data noise.

FIG. 7 illustrates a flow chart that illustrates a method for suppressing seafloor geophone seismic data noise. For clarity of presentation, the description that follows generally describes method 700 in the context of FIGS. 1-6d. For example, as illustrated, particular steps of the method 700 may be performed on or at the computing system 100. However, method 700 may be performed, for example, by any other suitable system, environment, software, and hardware, or a combination of systems, environments, software, and hardware as appropriate. Operations of method 700 can include one or more optional steps, including only one or more of the steps being performed, and further, that the steps of FIG. 7 can be performed in any order.

At step 702, the computing device 102 receives data 120. The data 120 can identify i) a hydrophone seismic data component (P), ii) a vertical geophone seismic data component ($V_z$), iii) a first horizontal geophone seismic data component ($V_x$) and iv) a second horizontal geophone seismic data component ($V_y$). At 704, the masking filter module 140 applies a masking filter based on the first horizontal geophone seismic data component and the vertical geophone seismic data component to partition the vertical geophone seismic data component into a first and a second vertical geophone seismic data component. At 706, the adaptive subtraction module 142 adaptively subtracts the first horizontal geophone seismic data component from the second vertical geophone seismic data component to obtain a first new vertical geophone seismic data component. At 708, the summation module 144 sums the first vertical geophone seismic data component and the first new vertical geophone seismic data component to obtain a de-noised vertical geophone seismic data component. At 710, the masking filter module 140 applies the masking filter based on the second horizontal geophone seismic data component and the de-noised vertical geophone seismic data component to partition the de-noised vertical geophone seismic data component into a first and a second de-noised vertical geophone seismic data component. At 712, the adaptive subtraction module 142 adaptively subtracts the second horizontal geophone seismic data component from the second de-noised vertical geophone seismic data component to obtain a second new vertical geophone seismic data component. At 714, the summation module 144, sums the first de-noised vertical geophone seismic data component and the second new vertical geophone seismic data component to obtain a further de-noised vertical geophone seismic data component. At 716, the signal envelope matching module 146 matches a signal envelope between the hydrophone seismic data component and the vertical geophone seismic data component based on the hydrophone seismic data component and the further de-noised. At 718, the computing device 102 obtains a final vertical geophone seismic data component 160 based on i) the second de-noised vertical geophone seismic data component and ii) the scaling coefficient.

Figure 8:
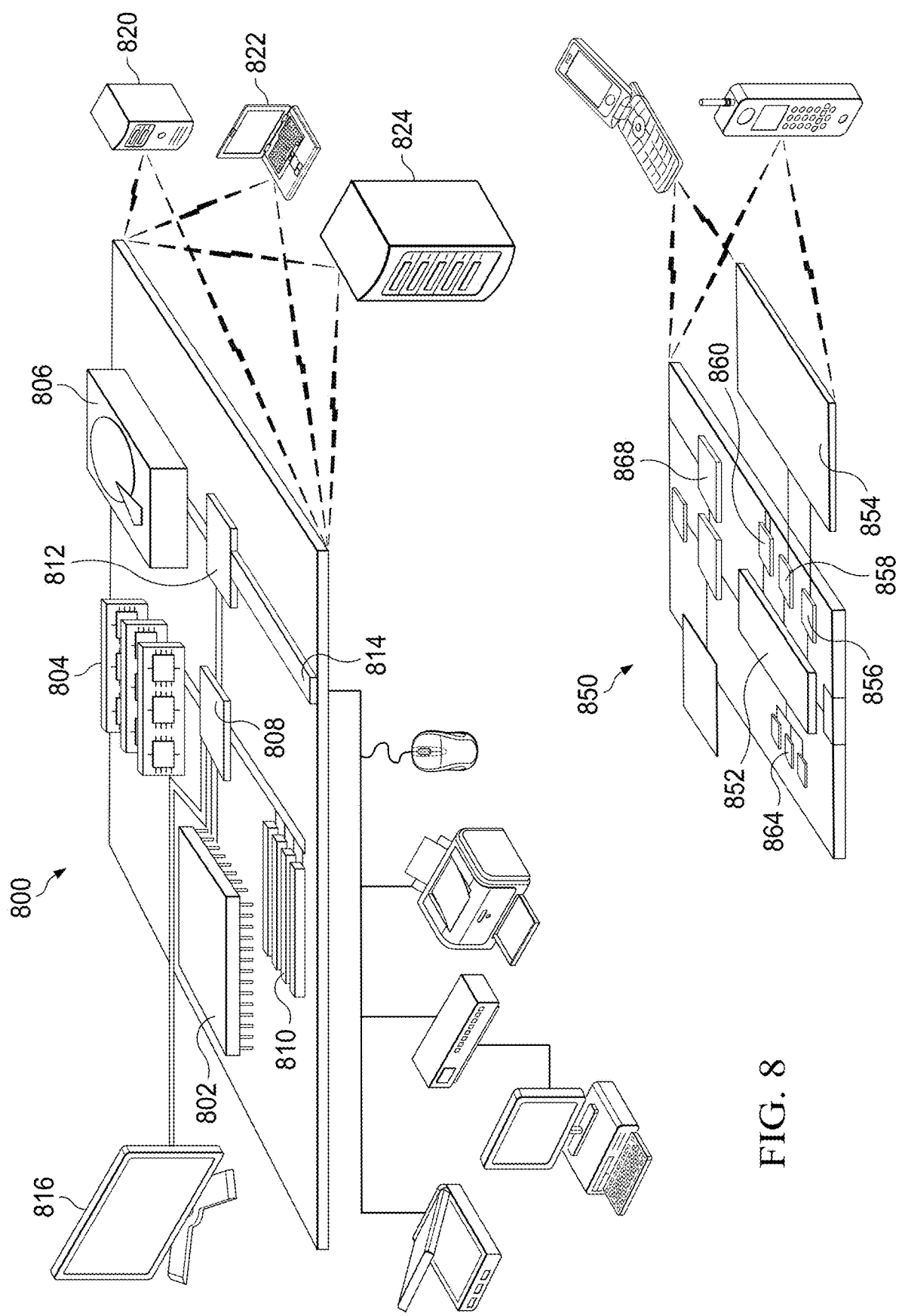
FIG. 8 illustrates an example computing environment for implementing the described techniques.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, and mainframes. Computing device 850 is intended to represent various forms of mobile devices, such as personal digital assistants, cellular telephones, and smartphones. The components shown here, their connections and relationships, and their functions, are meant to be exemplary only and are not meant to limit implementations of the inventions described in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 may process instructions for execution within the computing device 800, including instructions stored in the memory 804 or on the storage device 806 to display graphical information for a graphical user interface (GUI) on an external input/output device, such as display 816 coupled to high speed interface 808. In other implementations, multiple processors, and multiple buses, or both, may be used, as appropriate, along with multiple memories and types of memory. Also, multiple computing devices 800 may be connected. Each computing device can provide portions of the necessary operations (for example, as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods. The information carrier is a computer- or machine-readable medium, such as the memory 804, the storage device 806, or a memory on processor 802.

The high speed controller 808 manages bandwidth-intensive operations for the computing device 800 The low speed controller 812 manages lower bandwidth-intensive operations. Such allocation of functions is exemplary only. In one implementation, the high-speed controller 808 is coupled to memory 804, display 816 (for example, through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (for example, USB (Universal Serial Bus), Bluetooth, Ethernet, wireless Ethernet) may be coupled to one or more input/output devices, such as a keyboard, a pointing device, a scanner, or a networking device such as a switch or router, for example, through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other. no[0000]

Computing device 850 includes a processor 852, memory 864, an input/output device such as a display 854, a communication interface 860, and a transceiver 868, among other components. The device 850 may also be provided with a storage device, such as a microdrive or other device, to provide additional storage. Each of the components 850, 852, 864, 854, 860, and 868, are interconnected using various buses, and several of the components may be mounted on a common motherboard or in other manners as appropriate.

The processor 852 may execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850. Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor

What is claimed is:

1. A computer-implemented method, comprising:
    operating a seafloor seismic acquisition system comprising a hydrophone and three geophones to acquire seismic data, wherein the hydrophone is configured to acquire a hydrophone seismic data component, wherein a first geophone is configured to acquire a vertical geophone seismic data component, and wherein a second and third geophone are configured to acquire a first and second horizontal geophone seismic data component, respectively;
    receiving the seismic data identifying i) the hydrophone seismic data component, ii) the vertical geophone seismic data component, and iii) the first and the second horizontal geophone seismic data component;
    partitioning the vertical geophone seismic data component into a first and a second vertical geophone seismic data component using a masking filter based on the first horizontal geophone seismic data component and the vertical geophone seismic data component;
    adaptively subtracting the first horizontal geophone seismic data component from the second vertical geophone seismic data component to obtain a first new vertical geophone seismic data component;
    summing the first vertical geophone seismic data component and the first new vertical geophone seismic data component to obtain a de-noised vertical geophone seismic data component;
    partitioning the de-noised vertical geophone seismic data component into a first and a second de-noised vertical geophone seismic data component using the masking filter based on the second horizontal geophone seismic data component and the de-noised vertical geophone seismic data component;
    adaptively subtracting the second horizontal geophone seismic data component from the second de-noised vertical geophone seismic data component to obtain a second new vertical geophone seismic data component;
    summing the first de-noised vertical geophone seismic data component and the second new vertical geophone seismic data component to obtain a further de-noised vertical geophone seismic data component;
    matching a signal envelope between the hydrophone seismic data component and the vertical geophone seismic data component based on the hydrophone seismic data component and the further de-noised vertical geophone seismic data component to identify a scaling coefficient; and
    obtaining a final vertical geophone seismic data component based on i) the second de-noised vertical geophone seismic data component and ii) the scaling coefficient.

2. The method of claim 1, wherein a sensitivity of the first vertical geophone seismic data component to the first horizontal geophone seismic data component is less than a sensitivity of the second vertical geophone seismic data component to the first horizontal geophone seismic data component.

3. The method of claim 1, wherein the second vertical geophone seismic data component complements the first vertical geophone seismic data component.

4. The method of claim 1, wherein the masking filter is a Butterworth filter.

5. The method of claim 1, wherein the first and the second horizontal geophone seismic data components include shear wave energy.

6. The method of claim 1, wherein matching the signal envelope is based on a Hilbert transform.

7. The method of claim 1, wherein an amplitude of the final vertical geophone seismic data component is similar to an amplitude of the hydrophone seismic data component.

8. The method of claim 1, wherein the de-noised vertical geophone seismic data component is independent of the first horizontal geophone seismic data.

9. The method of claim 1, wherein the further de-noised vertical geophone seismic data component is independent of the second horizontal geophone seismic data.

10. A system, comprising:
    one or more processors; and
    a non-transitory computer-readable storage medium coupled to the one or more processors and storing programming instructions for execution by the one or more processors, the programming instructions instruct the one or more processors to:
        operating a seafloor seismic acquisition system comprising a hydrophone and three geophones to acquire seismic data, wherein the hydrophone is configured to acquire a hydrophone seismic data component, wherein a first geophone is configured to acquire a vertical geophone seismic data component, and wherein a second and third geophone are configured to acquire a first and second horizontal geophone seismic data component, respectively;

receiving the seismic data identifying i) the hydrophone seismic data component, ii) the vertical geophone seismic data component, and iii) the first and the second horizontal geophone seismic data component;

partitioning the vertical geophone seismic data component into a first and a second vertical geophone seismic data component using a masking filter based on the first horizontal geophone seismic data component and the vertical geophone seismic data component;

adaptively subtracting the first horizontal geophone seismic data component from the second vertical geophone seismic data component to obtain a first new vertical geophone seismic data component;

summing the first vertical geophone seismic data component and the first new vertical geophone seismic data component to obtain a de-noised vertical geophone seismic data component;

partitioning the de-noised vertical geophone seismic data component into a first and a second de-noised vertical geophone seismic data component using the masking filter based on the second horizontal geophone seismic data component and the de-noised vertical geophone seismic data component;

adaptively subtracting the second horizontal geophone seismic data component from the second de-noised vertical geophone seismic data component to obtain a second new vertical geophone seismic data component;

summing the first de-noised vertical geophone seismic data component and the second new vertical geophone seismic data component to obtain a further de-noised vertical geophone seismic data component;

matching a signal envelope between the hydrophone seismic data component and the vertical geophone seismic data component based on the hydrophone seismic data component and the further de-noised vertical geophone seismic data component to identify a scaling coefficient; and obtaining a final vertical geophone seismic data component based on i) the second de-noised vertical geophone seismic data component and ii) the scaling coefficient.

11. The system of claim 10, wherein a sensitivity of the first vertical geophone seismic data component to the first horizontal geophone seismic data component is less than a sensitivity of the second vertical geophone seismic data component to the first horizontal geophone seismic data component.

12. The system of claim 10, wherein the second vertical geophone seismic data component complements the first vertical geophone seismic data component.

13. The system of claim 10, wherein the masking filter is a Butterworth filter.

14. The system of claim 10, wherein the first and the second horizontal geophone seismic data components include shear wave energy.

15. The system of claim 10, wherein matching the signal envelope is based on a Hilbert transform.

16. The system of claim 10, wherein an amplitude of the final vertical geophone seismic data component is similar to an amplitude of the hydrophone seismic data component.

17. The system of claim 10, wherein the de-noised vertical geophone seismic data component is independent of the first horizontal geophone seismic data.

18. The system of claim 10, wherein the further de-noised vertical geophone seismic data component is independent of the second horizontal geophone seismic data.

19. A non-transitory computer readable medium storing instructions to cause one or more processors to perform operations comprising:

operating a seafloor seismic acquisition system comprising a hydrophone and three geophones to acquire seismic data, wherein the hydrophone is configured to acquire a hydrophone seismic data component, wherein a first geophone is configured to acquire a vertical geophone seismic data component, and wherein a second and third geophone are configured to acquire a first and second horizontal geophone seismic data component, respectively;

receiving the seismic data identifying i) the hydrophone seismic data component, ii) the vertical geophone seismic data component, and iii) the first and the second horizontal geophone seismic data component;

partitioning the vertical geophone seismic data component into a first and a second vertical geophone seismic data component using a masking filter based on the first horizontal geophone seismic data component and the vertical geophone seismic data component;

adaptively subtracting the first horizontal geophone seismic data component from the second vertical geophone seismic data component to obtain a first new vertical geophone seismic data component;

summing the first vertical geophone seismic data component and the first new vertical geophone seismic data component to obtain a de-noised vertical geophone seismic data component;

partitioning the de-noised vertical geophone seismic data component into a first and a second de-noised vertical geophone seismic data component using the masking filter based on the second horizontal geophone seismic data component and the de-noised vertical geophone seismic data component;

adaptively subtracting the second horizontal geophone seismic data component from the second de-noised vertical geophone seismic data component to obtain a second new vertical geophone seismic data component;

summing the first de-noised vertical geophone seismic data component and the second new vertical geophone seismic data component to obtain a further de-noised vertical geophone seismic data component;

matching a signal envelope between the hydrophone seismic data component and the vertical geophone seismic data component based on the hydrophone seismic data component and the further de-noised vertical geophone seismic data component to identify a scaling coefficient; and obtaining a final vertical geophone seismic data component based on i) the second de-noised vertical geophone seismic data component and ii) the scaling coefficient.

20. The computer readable medium of claim 19, wherein a sensitivity of the first vertical geophone seismic data component to the first horizontal geophone seismic data component is less than a sensitivity of the second vertical geophone seismic data component to the first horizontal geophone seismic data component.

\* \* \* \* \*